June 24, 1924.
F. FRISK
1,499,010
AUTO GOLF BAG CARRIER
Filed March 20, 1922
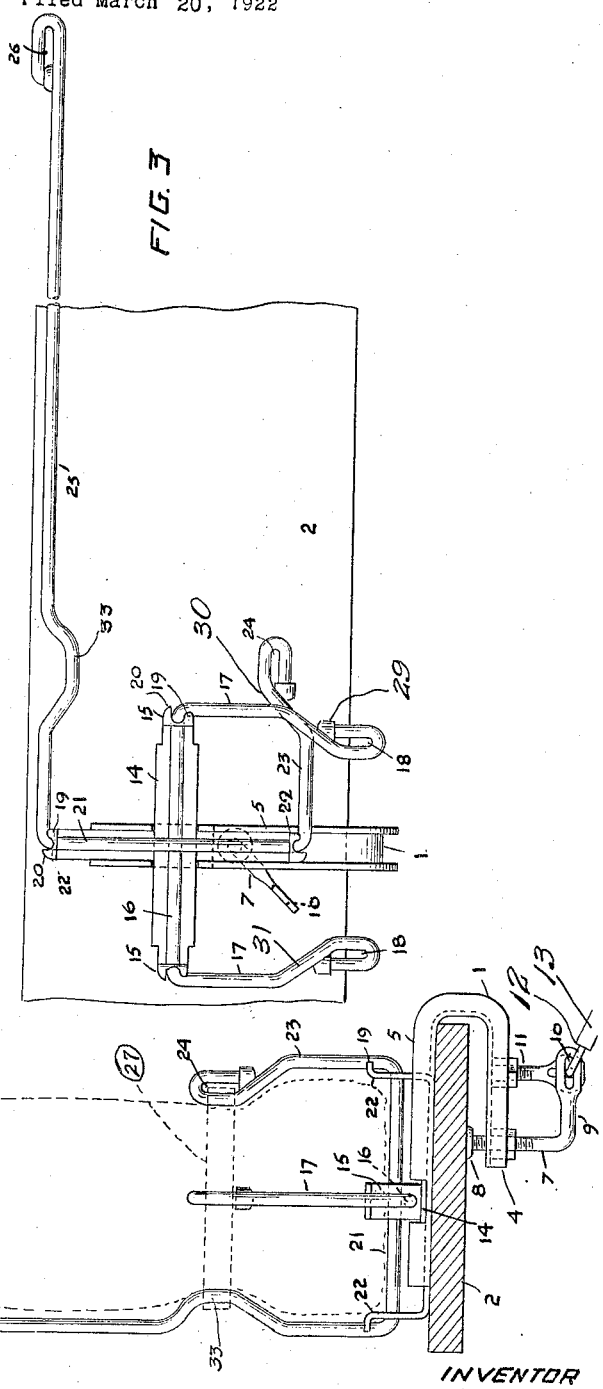
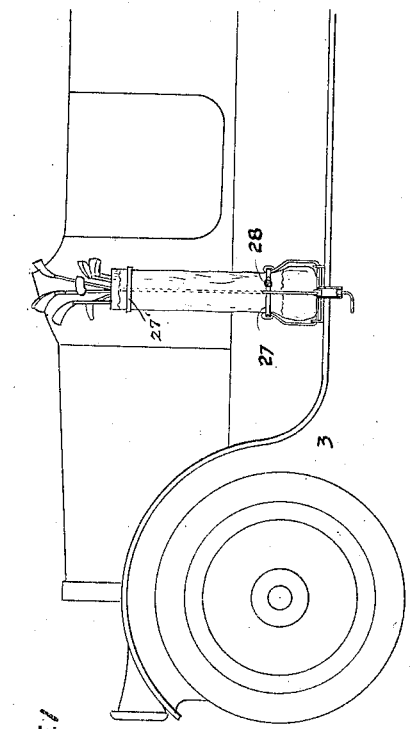
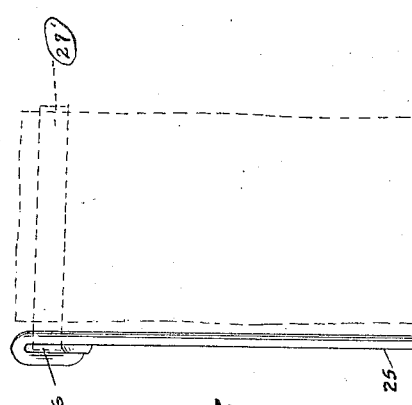
INVENTOR
F. FRISK
BY Wright & Chumm
ATT'YS Patented June 24, 1924.

1,499,010

UNITED STATES PATENT OFFICE.

FREDERICK FRISK, OF SAN FRANCISCO, CALIFORNIA, ASSIGNOR, BY DIRECT AND MESNE ASSIGNMENTS, TO FRISK MANUFACTURING COMPANY, OF SAN FRANCISCO, CALIFORNIA, A CORPORATION OF CALIFORNIA.

AUTO GOLF-BAG CARRIER.

Application filed March 20, 1922. Serial No. 545,057.

*To all whom it may concern:*

Be it known that I, FREDERICK FRISK, a citizen of the United States, residing at San Francisco, in the county of San Francisco and State of California, have invented new and useful Improvements in Auto Golf-Bag Carriers, of which the following is a specification.

The primary object of this invention is to provide a simply constructed and inexpensive device for supporting in a convenient and accessible position upon an automobile, a golf club case or bag ordinarily referred to as a golf bag.

Another object of the invention is to provide a device of the character described which is in the form of an attachment adapted to be secured to the running board of an automobile and which is constructed so that it may be collapsed or folded in a compact and out-of-the-way position when not in use.

Another object of the invention is to provide a golf bag carrier of the character described which may be locked upon the automobile so that it cannot be removed by unauthorized persons.

A further object is to provide a carrier such as described which will not rattle or work loose after attachment to the automobile and which does not require any change in the construction of any automobile to effect its attachment.

An additional object is to provide a carrier which will support the golf bag in upright position in such manner that the clubs will not be jarred out of the bag.

The invention possesses other advantages and features some of which, with the foregoing will be set forth at length in the following description where I shall outline in full that form of the invention which I have selected for illustration in the drawing accompanying and forming a part of the present specification. In said drawings I have shown one form of the construction of my invention, but it is to be understood that I do not limit myself to such form since the invention as expressed in the claims may be embodied in a plurality of forms.

Referring to the drawing:

Figure 1 represents a fragmentary side elevation of an automobile showing the carrier of my invention as when in use.

Figure 2 represents a side elevation of the carrier, the running board being shown in cross section.

Figure 3 represents a top plan view of the carrier.

In the drawing, the embodiment of my invention illustrated in detail comprises a clamp 1 adapted to be removably affixed to the running board 2 of an automobile 3 only part of which latter is shown. The clamp serves as the body of the carrier and is of a substantially U shape with a short arm 4 adapted to extend under the board 2 and a longer arm 5 adapted to lie upon the upper side of the board, said clamp being preferably formed of channel iron. In the short arm 4 is a screw 7 with a flat member 8 its inner end arranged to engage the board 2. The other end of the screw is bent right angularly to form a handle 9 and said handle is provided with an aperture 10. The arm 4 has an apertured appendage 11 riveted or otherwise fixed thereto. After tightening the screw to securely fix the clamp on the board the hasp 12 of a padlock 13 may be inserted as shown in Figure 3 through the apertures in the handle and appendage and then locked so as to lock the clamp on the running board.

A collapsible or foldable bracket or golf bag support is affixed to the clamp 1 and to a cross piece 14 in turn fixed centrally of its ends to a mediate part of the arm 5 of said clamp. The piece 14 has upturned apertured ends 15. The bracket or support comprises an inverted U shaped member made up of a rod 16 rotatably mounted in the apertured ends 15 and lying above and parallel to the cross piece 14. After passing through the end 15 the rod is bent upwardly to provide short arms 17 having eyes 18 in their upper ends. The ends 15 have small protuberances 19 thereon which the lower end portions of the arms 17 engage and snap fast when moved into and out of upright position said protuberances 19 and stops 20 serving to hold the arms in upright position and under sufficient tension to prevent rattling.

The bracket or support also includes a member similar to the rod 16 and arms 17 which second named member is disposed at right angles to the first named member and comprises a rod 21 of the same length as the one 16 and which is rotatable in apertured ears 22 provided on the arm 5 of the clamp 1. This rod 21 extends above and across the rod 16 and at one end is turned upwardly to provide a short arm 23 of the same length as the ones 17 and has an eye 24 at its upper extremity. The other end of the rod 21 is bent to provide a long upright supporting arm 25 having at its upper end an eye 26. The four arms are spaced apart sufficiently to receive a golf bag therebetween. The shorter arms 17 and 23 are just long enough to extend above the stiffened lower end portion of the golf bag and the eyes on said arms are inwardly offset so as to press inwardly the flexible part of the bag immediately above the non-flexible lower end of the bag, the bottom of the bag being rested upon the rods 16 and 21. A strap 27 is threaded through the eyes on the short arms and is adapted to surround the golf bag. A suitable buckle 28 may be provided on the strap.

A similar strap 27' is threaded through the eye 26 on the longer arm 25 and is adapted to surround the bag at a point near the upper end of said bag, said arm being of such length as to terminate near the upper end of the bag. By securing the bag to and between the arms with said straps the bag will be held in upright and extended position in a firm manner such that it will not jar loose or fall out of the bracket, the clubs being readily accessible as is the bag itself when its removal is desired.

The device may be readily folded so as to lie flat upon the running board, the arms 23 and 25 being first folded so as to lie upon the board parallel to the longitudinal axis of the board whereas the arms 17 are then folded outwardly and downwardly to lie over the board. One of the arms 17 will lie over and across the arms 23. The shorter arms have rubber bumper members 29 similar to washers mounted near the eyes thereon and said bumper member will engage the board so as to prevent rattling of the devices and scratching of the board.

The arm 23 is formed so that one edge provides an inclined or cam surface 30. This surface is adapted to bear upon the arm 17 which overlies the arm 23 whereby when the arm 26 is grasped and raised the arm 23 will press upwardly upon and move the arms 17 into up position. The arm 17 near its eye is provided with an inclined cam surface 31 which will be engaged by the cam surface 30 when the arm 23 is partly raised whereby the raising to upright or nearly upright position of both sets of arms may be simultaneously effected with a single operation.

The long arm 25 may be inwardly offset as at 33 so as to press inwardly upon the bag at a point just above the stiffened lower end thereof, similarly to the eyes on the short arms. By this arrangement the bag will be gripped so as to be firmly held in the carrier.

Preferably the bag is placed in position to be held by the carrier when the arms 17, 23 and 25 are in folded position. With the bag thus placed the arms 17 may be grasped and lifted upwardly first and then the arms 23 and 25, or if desired, by lifting the arms 25, all of the arms will be moved into upright position. When the arms are moved into upright position the inwardly extending or offset portions thereof will clear the relatively stiff lower part of the bag and press inwardly the flexible part of the bag so as to grip the latter immediately over the rigid part, this being particularly shown in Figs. 1 and 2. By making certain of the arms shorter than the others, the shorter arms may be folded inwardly and outwardly with respect to the body of the car and in either instance will not touch the side of the car or project to an appreciable extent outwardly from the running-board.

I claim:—

1. A carrier comprising a body member adapted for attachment to a part of a motor vehicle, article supporting members mounted on said body member so as to be moved from upright supporting position to folded position, lying substantially flat upon said part of the motor vehicle and vice versa, and means for securing to said supporting members an article which is placed in upright position between said members, one of said supporting members being longer than the others and adapted to extend to a point adjacent the upper end of the article, the shorter supporting members being movable in planes intersecting the planes of movement of the longer supporting members.

2. An automobile golf bag carrier comprising a body member adapted for attachment to a part of an automobile, a plurality of arms mounted on the body so as to be movable from a substantially horizontal position into an upright position said arms being spaced apart so as to receive therebetween a golf bag and means for securing the bag to said arms.

3. A golf bag carrier for automobiles comprising a clamp adapted to be mounted upon the running board of an automobile, arms extending upwardly from said clamp and adapted to receive between them a glof bag, and members rotatable on said clamp and on which the arms are carried.

4. A golf bag carrier for automobiles comprising a clamp adapted to be mounted upon the running board of an automobile, arms extending upwardly from said clamp and adapted to receive between them a golf bag, and members rotatable on said clamp and on which the rods are carried said rods having inwardly projecting portions adapted to engage and force inwardly the lower flexible part of the golf bag.

5. A golf bag carrier for automobiles comprising a clamp adapted to be mounted upon the running board of an automobile, arms extending upwardly from said clamp and adapted to receive between them a golf bag, and members rotatable on said clamp and on which the rods are carried, said arms being adapted to fold so as to overlie one another on the running board whereby movement of certain of said arms into upright position will effect corresponding movement of the other of said arms.

6. An automobile golf bag carrier comprising a body member adapted for attachment to a part of an automobile, a plurality of arms mounted on the body so as to be movable from a substantially horizontal position into an upright position, said arms being spaced apart so as to receive therebetween a golf bag, said arms having inwardly extending portions adapted to press inwardly the flexible part of the bag adjacent its lower end.

FREDERICK FRISK.